United States Patent
Balakrishnan et al.

(10) Patent No.: US 11,171,674 B2
(45) Date of Patent: Nov. 9, 2021

(54) LOW-COMPLEXITY INVERSE SINC FOR RF SAMPLING TRANSMITTERS

(71) Applicant: TEXAS INSTRUMENTS INCORPORATED, Dallas, TX (US)

(72) Inventors: Jaiganesh Balakrishnan, Karnataka (IN); Sriram Murali, Karnataka (IN); Sundarrajan Rangachari, Tamilnadu (IN); Yeswanth Guntupalli, Andhra Pradesh (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/022,871

(22) Filed: Sep. 16, 2020

(65) Prior Publication Data
US 2021/0083695 A1    Mar. 18, 2021

(30) Foreign Application Priority Data
Sep. 18, 2019   (IN) .............................. 201941037591

(51) Int. Cl.
*H04L 5/12*   (2006.01)
*H04L 23/02*   (2006.01)
*H04B 1/00*   (2006.01)

(52) U.S. Cl.
CPC ........... *H04B 1/0025* (2013.01); *H04B 1/001* (2013.01); *H04B 1/0042* (2013.01)

(58) Field of Classification Search
CPC ..... H04B 1/0025; H04B 1/0042; H04B 1/001
USPC .......................................................... 375/262
See application file for complete search history.

(56) References Cited

U.S. PATENT DOCUMENTS

| 6,611,570 | B1 * | 8/2003 | Subramanian | H03D 7/165 375/326 |
| 6,714,071 | B1 * | 3/2004 | Page | H03G 3/3047 330/136 |
| 6,900,693 | B2 * | 5/2005 | Sasho | H03F 1/0266 330/133 |
| 8,107,562 | B2 * | 1/2012 | Li | H04L 25/061 375/341 |
| 9,014,312 | B1 * | 4/2015 | Haddadin | H04N 21/426 375/346 |
| 9,413,394 | B1 * | 8/2016 | Lye | H03F 1/02 |
| 2002/0176522 | A1 * | 11/2002 | Fan | H04B 1/0014 375/340 |

(Continued)

*Primary Examiner* — Tanmay K Shah
(74) *Attorney, Agent, or Firm* — John R. Pessetto; Charles A. Brill; Frank D. Cimino

(57) ABSTRACT

A radio-frequency (RF) sampling transmitter (e.g., of the type that may be used in 5G wireless base stations) includes a complex baseband digital-to-analog converter (DAC) response compensator that operates on a complex baseband signal at a sampling rate lower than the sampling rate of an RF sampling DAC in the RF sampling transmitter. The DAC response compensator flattens the sample-and-hold response of the RF sampling DAC only in the passband of interest, addressing the problem of a sinc response introduced by the sample-and-hold operation of the RF sampling DAC and avoiding the architectural complexity and high power consumption of an inverse sinc filter that operates on the signal at a point in the signal chain after it has already been up-converted to an RF passband.

20 Claims, 9 Drawing Sheets

(56) References Cited

U.S. PATENT DOCUMENTS

2016/0050010 A1* 2/2016 Buehler ............... H04B 1/0042
  455/73
2018/0205399 A1* 7/2018 Baringer ................ H04B 1/001

* cited by examiner

LOW-COMPLEXITY INVERSE SINC FOR RF SAMPLING TRANSMITTERS

CROSS-REFERENCE TO RELATED APPLICATION

This application claims priority to Indian provisional patent application No. 201941037591 filed 18 Sep. 2019.

TECHNICAL FIELD

The present invention relates generally to electronic circuits, and particularly to low-complexity circuitry for generating the inverse sinc function for RF sampling transmitters.

BACKGROUND

Radio-frequency (RF) sampling transceivers can be used in wireless base stations, for example, those used in the fifth generation wireless technology for digital cellular networks known as "5G." In an RF sampling transmitter, an RF signal is generated directly with a high-speed, high-performance digital-to-analog converter (DAC) (e.g., one that operates at 14 bits, 12 gigasamples per second), thereby avoiding the need for mixers in the RF/analog domain. This architecture can enable simultaneous multi-band transmission by employing digital up-converters (DUCs) for each of several bands originating from respective digital signals, using just a single RF/analog transmitter chain.

The sine cardinal ("sinc") function, also called the "sampling function," is a function that arises frequently in signal processing and the theory of Fourier transforms. The sinc function is usually defined as $\sin(x)/x$ or $\sin(\pi x)/\pi x$, depending on the context.

SUMMARY

An example radio-frequency (RF) sampling transmitter includes a first-stage up-sampler configured to interpolate a complex digital baseband input signal by a first-stage up-sampling factor M. An digital-to-analog converter (DAC) response compensator is coupled to an outputs of the first-stage up-sampler. The DAC response compensator is configured to flatten a spectral region of an RF DAC sample-and-hold response based on a center frequency $f_{c1}$ that is normalized by a DAC sampling rate $f_s$ and on an interface rate $f_{int}$ of the complex digital baseband input signal. A second-stage up-sampler is coupled to an output of the DAC response compensator and is configured to interpolate an output signals from the DAC response compensator by a second-stage up-sampling factor N/M. A digital up-conversion mixer is coupled to an output of the second-stage up-sampler and is configured to convert an output signal from the second-stage up-sampler to the center frequency $k_{c1}$. An RF sampling DAC is coupled to an output of the digital up-conversion mixer and is configured to convert the output of the digital up-conversion mixer or a signal based on the output of the digital up-conversion mixer into an analog signal.

Another example provides a method of compensating for a sinc response in an RF sampling transmitter. A complex digital baseband input signal is interpolated by a first-stage up-sampling factor M to provide a first-stage-interpolated signal. In the first-stage-interpolated signal, a spectral region of an RF DAC sample-and-hold response is flattened based on a center frequency $f_{c1}$ that is normalized by a DAC sampling rate $f_s$ and on an interface rate $f_{int}$ of the complex digital baseband input signal to provide a compensated signal. The compensated signal is interpolated by a second-stage up-sampling factor N/M to provide a second-stage-interpolated signal. The second-stage-interpolated signal is digitally up-converted to the center frequency $f_{c1}$ to provide an up-converted signal. The up-converted signal or a signal based on the up-converted signal is converted into an analog RF signal.

DETAILED DESCRIPTION

A low-complexity digital circuitry architecture can use a complex baseband digital-to-analog converter (DAC) response compensator, at a sampling rate lower than the sampling rate of an associated radio-frequency (RF) sampling DAC, to invert the sample-and-hold response of the RF sampling DAC only in the passband of interest. The DAC response compensator can thus perform an inverse sinc operation in an RF sampling transmitter, enabling a reduction in power consumption as compared to architectures that attempt to address the sinc response of an RF sampling DAC by performing an inverse sinc operation on an RF digital signal over a larger portion of the signal spectrum.

Figure 1A:
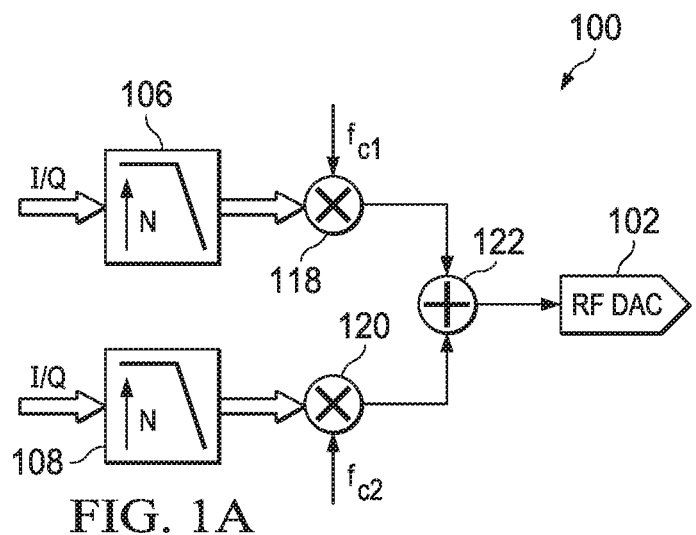
FIG. 1A is a high-level block diagram of an example dual-band RF sampling transmitter with a dual-band digital up-converter (DUC) feeding into a radio-frequency digital-to-analog converter (RF DAC) as may be used in a 5G wireless base station.

FIG. 1A illustrates an example dual-band RF sampling transmitter 100 with a high-speed, high-performance digital up-converter (DUC) of the type used, for example, in wireless baseband transmitters, e.g., for 5G systems. Complex digital baseband signals I/Q can be provided as inputs to transmitter 100 from a baseband processor, which may be, for example, a high-performance digital signal processor (DSP) or a general-purpose computer processor. A plurality (e.g., as illustrated, two) of complex digital baseband signals that each consists of in-phase signals I and quadrature signals Q, at a sampling rate $f_{int}$ of, e.g., hundreds of megasamples per second (MSPS), e.g., 500 MSPS, can be interpolated (e.g., by a factor of N=24) by respective interpolation filter 106 or 108. For example, each interpolation filter 106, 108 can up-sample its respective input signal by a factor of N using zero-insertion, that is, by inserting samples of zero value between signal samples, to generate samples at a rate of $f_s=N*f_{int}$, and can then filter out the images created by the up-sampling process. The interpolated signals can then be up-converted using respective independent digital up-conversion mixers 118, 120 to respective center frequencies $f_{c1}$ and $f_{c2}$. The output of each digital up-conversion mixer 118, 120 is a real signal, even though its input is an interpolated complex baseband I/Q signal. The center frequencies can be dynamically switched depending on the specific use case, including for example a loop-back calibration.

The up-converted signals can be combined at adder 122 to obtain a radio-frequency (RF) digital signal at, for example, 12 gigasamples per second (GSPS), and provided to an RF sampling digital-to-analog converter (DAC) 102 for conversion to an analog RF signal, which can be sent to a power amplifier (not shown) for RF transmission over the air. The RF DAC 102 can generate a continuous-time-domain signal, with a sample-and-hold operation, at a sampling rate of $f_s$. In the sample-and-hold operation, a digital sample s(n) is transmitted from time instant nT to (nT+7), where $T=1/f_s$.

The sample-and-hold operation in the RF DAC 102 causes a sinc response at the output of the RF DAC 102. As illustrated in the RF DAC sample-and-hold plot 302 of FIG. 3, the sinc response causes a spectral droop, that is, greater attenuation of signals at frequencies more distant from DC, that is as large as about 3 dB at a frequency of 0.45×$f_s$. However, wireless base stations have stringent requirements on spectral flatness (e.g., 0.2 dB peak-to-peak ripple) of the signals they produce. To achieve such spectral flatness, the sample-and-hold response of the RF DAC 102 can be inverted in the digital domain at multi-GSPS rates.

Figure 1B:
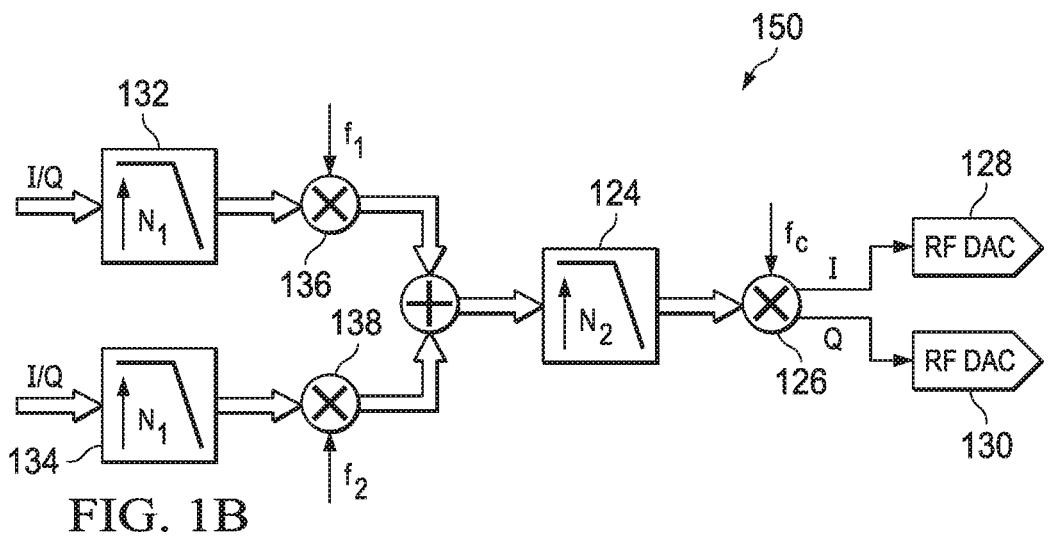
FIG. 1B is a high-level block diagram of an example dual-band RF sampling transmitter with a dual-band DUC feeding into dual RF DACs.

FIG. 1B illustrates another example dual-band RF sampling transmitter 150, similar to transmitter 100 of FIG. 1A, but with the following differences. Whereas in transmitter 100 of FIG. 1A the interpolation filters 106, 108 may have the interpolation factor N, the interpolation filters 132, 134 of transmitter 150 of FIG. 1B can each have the interpolation factor $N_1$ and the interpolation filter 124 of the second interpolate-and-upconvert stage of transmitter 150 of FIG. 1B can have the interpolation factor $N_2$, such that the product $N_1 \times N_2$ is equivalent to the interpolation factor N of FIG. 1A. This second interpolate-and-upconvert stage further includes digital up-conversion mixer 126, the output of which is separated as I and Q components that are provided to respective RF DACs 128, 130. The respective multipliers of first-stage up-conversion mixers 136, 138 of transmitter 150 in FIG. 1B can be set to respective first and second frequencies $f_1$, $f_2$, and the multiplier of second interpolate-and-upconvert stage up-conversion mixer 126 can be set to a center frequency $f_c$, such that the sum $f_1+f_c$ is equivalent to the center frequency $f_{c1}$ of transmitter 100 in FIG. 1A, and the sum $f_2+f_c$ is equivalent to the center frequency $f_{c2}$ of transmitter 100 in FIG. 1A. Up through the input of mixer 126, as indicated by thicker outline arrows, the signals are complex (I/Q). From the output of mixer 126 on, as indicated by thinner arrows, the signals routed to the respect DACs 128, 130 are only I or Q.

Figure 2:
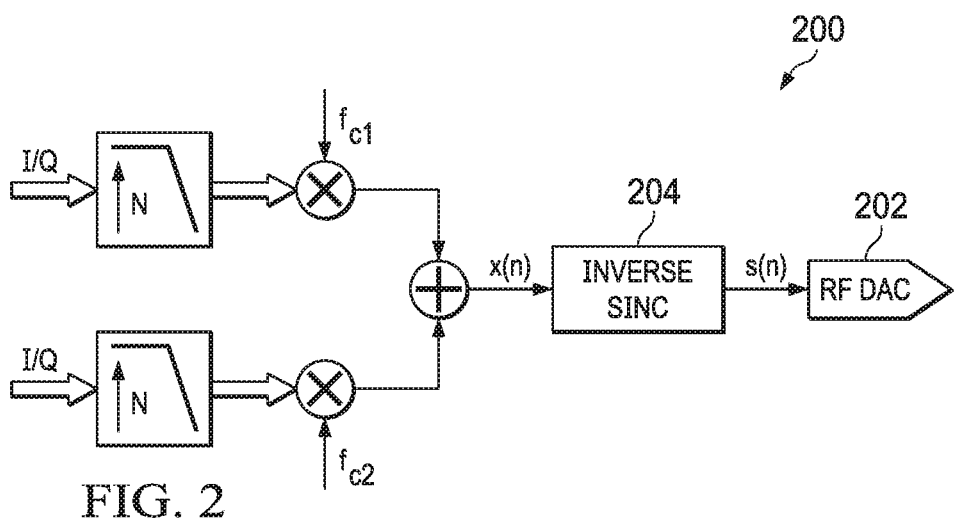
FIG. 2 is a high-level block diagram of an example RF sampling transmitter having a dual-band DUC feeding into a digital inverse sinc filter before feeding into an RF DAC.

FIG. 2 illustrates an example RF sampling transmitter 200 with a DUC in which a sinc response imparted to the output signal by the RF DAC 102 or 202 is mitigated using a digital inverse sinc filter 204 that modifies the up-converted signal prior to the feeding of the up-converted signal into the RF DAC 202. The sequence x(n) can represent the input signal to the inverse sinc filter 204, with L taps and with coefficients represented by the sequence {$h_0, h_1, \ldots, h_{L-1}$}. The inverse sinc filter 204 can compute the RF DAC input signal s(n) as shown below:

$$s(n) = \sum_{k=0}^{L-1} x(n-k) * h_k$$

Figure 3:
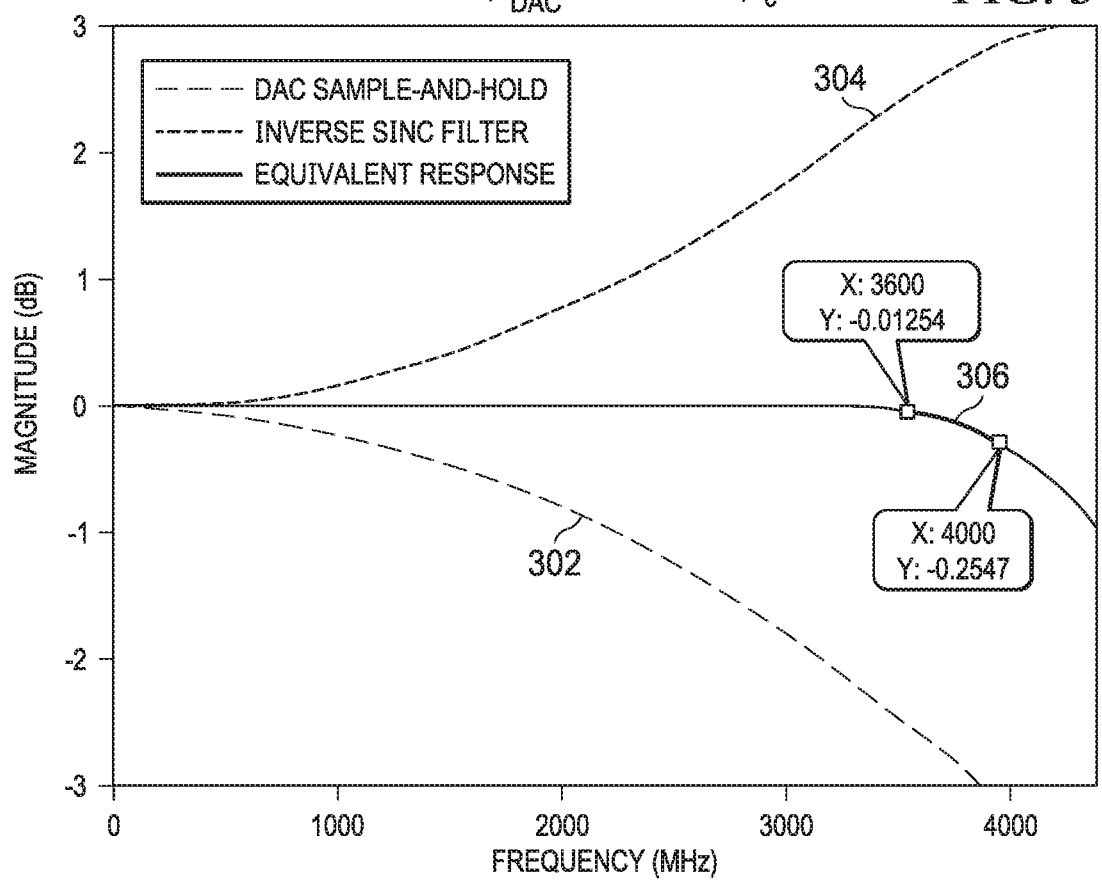
FIG. 3 is a graph of the equivalent frequency response of an example inverse sinc filter.

The graph of FIG. 3 shows that inverse sinc filter 204, the frequency response of which is shown in plot 304 at the top of FIG. 3, can compensate for the spectral droop created by the sample-and-hold DAC response 302. The result of this compensation is illustrated by the composite response at the middle of the graph of FIG. 3, and particularly the reduced-droop portion 306 in the signal band of interest centered around the center frequency $f_c$, which in the illustrated example is 3.8 GHz, with a 400 MHz bandwidth spanning from 3.6 GHz to 4.0 GHz.

However, inverse sinc filter 204 may be power- and digital area-intensive and architecturally complex. Although inverse sinc filter 204 can be designed as a fixed-coefficient filter, because it is oblivious to the intended center frequency of transmission, it compensates for the sinc response of the RF DAC 202 over all potential center frequencies by operating on the entire spectrum of an RF-frequency signal. This functionality can be excessively power-hungry. The complexity of the inverse sinc filter 204 depends on the target ripple and the maximum useable frequency of the RF DAC 202, in other words, the acceptable level of spectral droop in the composite signal. For example, a 9-tap finite impulse response (FIR) may be required to support a bandwidth that is 85 percent of the Nyquist band with 0.1 dB ripple. The Nyquist band for RF sampling transmitters like those shown in FIGS. 1 and 2 considered to be between DC and $f_{DAC}/2$. The number of taps increases to about 13 taps for 90 percent bandwidth and to about 25 taps for 95 percent bandwidth. The power consumption of the inverse sinc filter 204 is directly proportional to the number of taps and to the sampling rate of the RF DAC 202. As an example, a 9-tap inverse sinc filter 204 operating at multi-GSPS rates can consume few tens of milliwatts (mW) at a DAC sampling rate of 12 GSPS, implemented in a 28 nm technology node. This level of power consumption may be unacceptably high in some wireless base station applications. Other limitations of the example shown in FIG. 2 are that this approach may limit the useable Nyquist band and that it may need different coefficients for first Nyquist, second Nyquist, and return-to-zero DAC modes.

Digital complexity and power consumption of RF sampling transmitter 200 can be significant, as interpolation of the complex baseband samples and the processing used to generate the RF DAC samples at GSPS rates can involve circuitry of high complexity that consequently uses a significant fraction of the overall total power of the transmitter system. Low power consumption can be a key requirement for wireless base station applications. Accordingly, a low-complexity architecture can be provided to perform an inverse sinc operation in an RF sampling transmitter, enabling a reduction in power consumption.

Figure 4A:
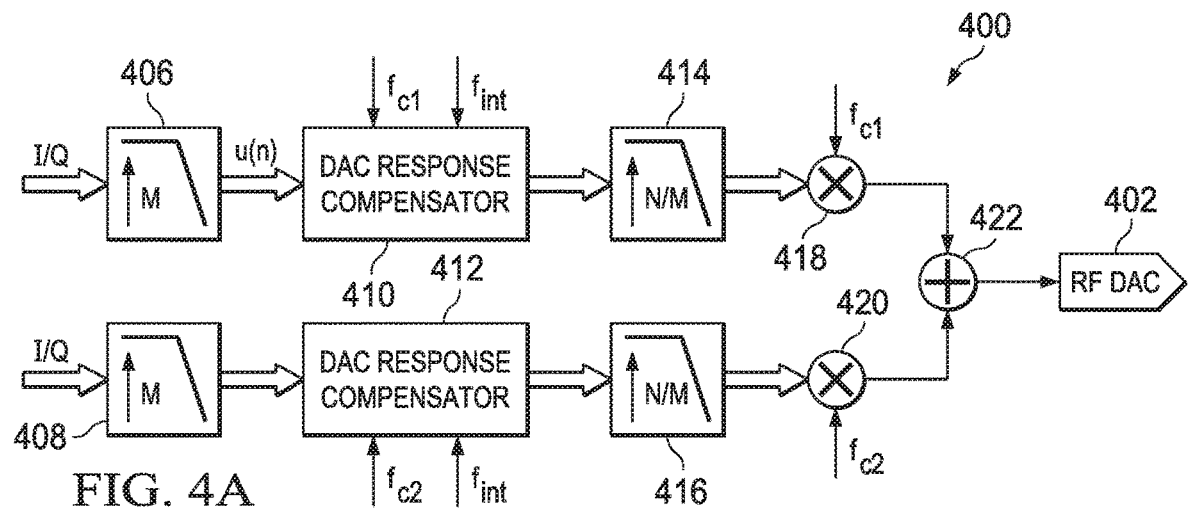
FIG. 4A is a high-level block diagram of an example dual-band RF sampling transmitter having a transformation-based interpolation filter.

FIG. 4A shows an example dual-band RF sampling transmitter 400 with a DUC in which a sinc response imparted to the output signal by RF DAC 402 is mitigated by including, for each band, a DAC response compensator 410, 412. RF sampling transmitter 400 can be provided as an alternative to examples that use inverse sinc filter 204. DAC response compensator 410 or 412 can operate in the complex baseband at a sampling rate that is lower than that of the DAC sampling rate $f_s$. Each DAC response compensator 410, 412 can be designed to flatten only the signal band of interest that is centered around the center frequency $f_c$ at the output of the RF sampling DAC. Interpolation is performed in two stages, an initial stage of up-samplers 406, 408 that interpolate by a factor of M, followed by a DAC response compensator stage and a second-stage interpolation by a factor of N/M using up-samplers 414, 416.

An increase in sampling rate at first-stage up-samplers 406, 408 means that the computations performed by DAC response compensator 410 or 412 are performed on more samples, increasing the complexity of DAC response compensator 410 or 412. On the other hand, the fractional bandwidth over which the response compensation is performed is reduced if DAC response compensator 410 or 412 works at higher sampling rates. In view of this tradeoff condition, there may be a sweet spot for the sampling rate input to DAC response compensator 410 or 412. For example, the RF sampling transmitter 400 may be configured, by setting first-stage upsampling factor M, to work over a fractional bandwidth of 400 MHz out of 1 GHz input sampling rate to the DAC response compensator 410 or 412, as is the case in the examples illustrated in FIGS. 3 and 8. Accordingly, first-stage upsampling factor M can be chosen appropriately to optimize the complexity of the DAC response compensator 410 or 412. For example, positioning the compensator at twice the interface rate $f_{int}$ with a choice of M=2 may provide an acceptable trade-off between in-band ripple and power consumption for the DAC response compensator 410 or 412.

The DAC response compensator 410 or 412 determines the appropriate region of the sample-and-hold response to be inverted, based on the center frequency $f_c$, normalized by the DAC sampling rate $f_s$, and the supported signal bandwidth that is a function of the interface rate $f_{int}$ (e.g., $0.8*f_{int}$). The interface rate $f_{int}$ is the sampling rate at which the I/Q baseband data is provided at the input to the RF sampling transmitter 400. The maximum transmission bandwidth of interest may be closely related to the interface rate $f_{int}$. For example, the maximum transmission bandwidth of interest may be about 80 percent of the interface rate $f_{int}$. For example, if an I/Q baseband data stream is sent to the RF sampling transmitter 400 at an interface rate $f_{int}$ of 125 MSPS, the maximum transmission bandwidth of interest for that band may be 100 MHz. The DAC response compensator parameters are computed based on the ratio of the center frequency to the DAC sampling rate $f_c/f_s$, the interface rate $f_{int}$, and the first-stage upsampling factor M. As shown in FIG. 4A, separate DAC response compensators 410, 412 can be employed for each of the two bands. The interpolated and DAC-response-compensated signals can be up-converted using independent digital up-conversion mixers 418, 420 to respective center frequencies $f_{c1}$ and $f_{c2}$. The up-converted signals are then combined at adder 422 and provided to the RF sampling DAC 402.

Figure 4B:
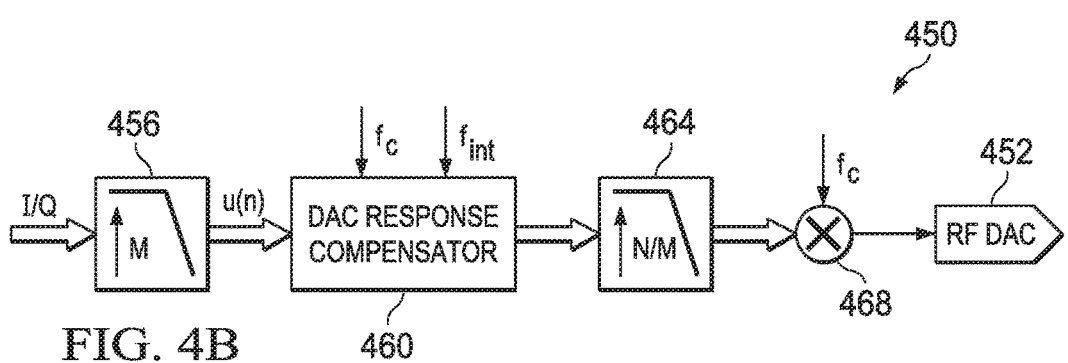
FIG. 4B is a high-level block diagram of an example single-band RF sampling transmitter having a transformation-based interpolation filter.

Although FIG. 4A illustrates a dual-band transmitter example, the use of a DAC response compensator as shown can be effective at compensating for a sinc response in single-band examples or examples having multiple bands more than two. FIG. 4B illustrates an example single-band RF sampling transmitter 450 with a DUC in which a sinc response imparted to the output signal by RF DAC 452 is mitigated by including DAC response compensator 460. Interpolation is performed in two stages, an initial stage having up-sampler 456 that interpolate by a factor of M, followed by a DAC response compensator stage 460 and a second-stage interpolation by a factor of N/M using up-sampler 464. The interpolated and DAC-response-compensated signals can be up-converted using digital up-conversion mixer 468 to center frequency $f_c$. The up-converted signal is then provided to the RF sampling DAC 452.

Figure 5A:
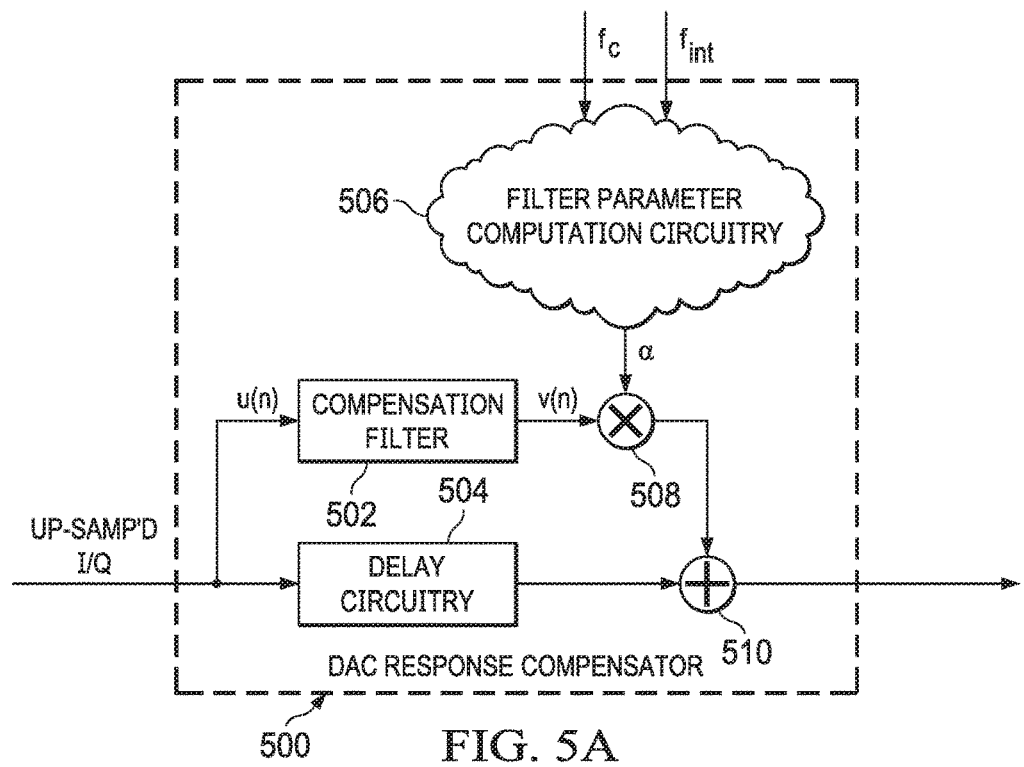
FIGS. 5A and 5B are block diagrams of example architectures of a DAC response compensator.
Figure 5B:
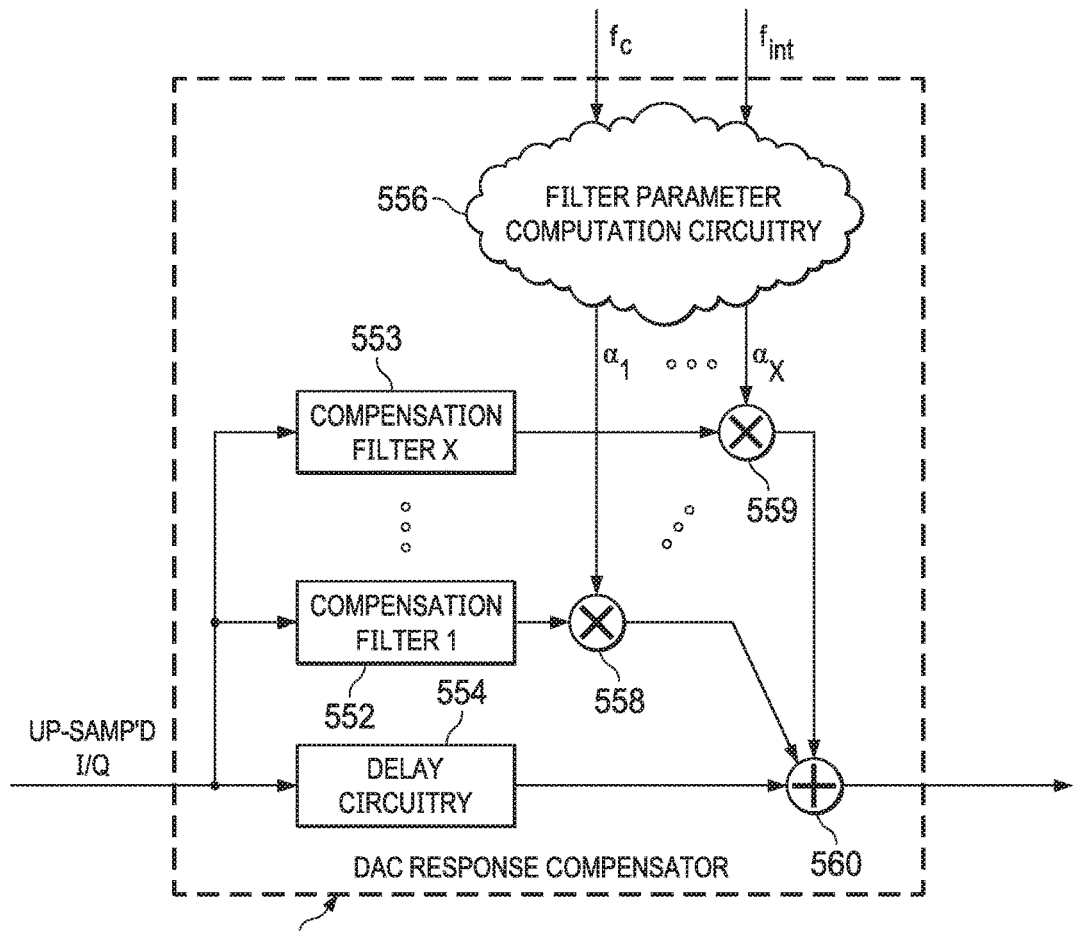

Inversion or flattening of the sinc response of the RF DAC 402 or 452 can be accomplished by providing a center-frequency-dependent profile for DAC response compensator 410, 412, or 460, which center-frequency dependence can be parameterized using a single complex parameter. FIGS. 5A and 5B show example implementations 500 of the DAC response compensator 410, 412, or 460 from FIG. 4A or 4B. DAC response compensator 500, shown in FIG. 5A, includes two signal paths that diverge from the input up-sampled I/Q baseband signal and then re-converge at adder 510. A first path includes delay circuitry 504 and a second path includes digital compensation filter 502 and scaling mixer 508. Digital compensation filter 502 can, for example, be a fixed-coefficient filter that operates on the complex baseband I/Q samples u(n) that have been obtained by interpolating the input complex based-band I/Q samples by a factor of M (e.g., M=2), as may be done by up-sampler 406 or 408 in FIG. 4A or up-sampler 456 in FIG. 4B. The output v(n) of the compensation filter 502 can be scaled by a complex parameter α at scaling mixer 508. The complex parameter α can be computed by filter parameter computation circuitry 506 based on the center frequency $f_c$, normalized by the DAC sampling rate $f_s$, and is also dependent on the interface rate $f_{int}$. The compensated output of the compensation filter, v(n), as scaled by the complex parameter α, can then be added at adder 510 to a delayed version of the up-sampled I/Q signal, as delayed by digital delay circuitry 504. The purpose of delay circuitry 504 is to match the group delay of any practical implementation of compensation filter 502. Because compensation filter 502 is a fixed-coefficient filter, it can only provide a fixed-frequency response. The fixed-coefficient compensation filter 502 can be configured to compensate for the characteristics of the DAC sample-and-hold response, but only over a small frequency band, corresponding to, for example, $0.8 \times f_{int}$. The scaling with the complex parameter α at scaling mixer 508 enables mapping the compensation filter characteristics to the appropriate center frequency $f_c$. Because the output of compensation filter 502 is two complex signals, scaling mixer 508 can be seen as four real multipliers internally, operating respectively on the real and imaginary parts of the two complex inputs to scaling mixer 508

The example of FIG. 5B is similar to the example of FIG. 5A, except that, whereas DAC response compensator 500 of FIG. 5A scales, at first scaling mixer 508, the output of a single fixed coefficient filter 502 by a single programmable-scale parameter α, DAC response compensator 550 of FIG. 5B includes a plurality of fixed-coefficient filters 552 through 553 in parallel, each using potentially different filter coefficients. The respective outputs of each of the compensation filters 552 through 553 are scaled by respective complex parameters $\alpha_1$ through $\alpha_x$ by respective scaling mixers 558 through 559. The value of each complex parameter $\alpha_1$ through $\alpha_x$ can depend on center frequency $f_c$, sampling rate $f_s$ and interface rate $f_{int}$. It may be noted from FIG. 5B in view of FIG. 5A that the single-parameter-based implementation 500 is a special-case example of the generic structure 550 of FIG. 5B that can include any number of signal paths, each having a respective compensation filter 552 through 553, the output of which is scaled by a respective complex parameter $\alpha_1$ through $\alpha_x$.

An RF sampling transmitter implemented using a DAC response compensator has the advantage of its complexity being largely agnostic of where the center frequency of transmission $f_c$ is between 0 and $f_{DAC}/2$. The sinc inversion can be done very effectively up through frequencies very close to $f_{DAC}/2$. Because the compensation happens in baseband, before a digital mixer that spectrally repositions the signal to an RF transmission center frequency, it can be performed at a much lower sampling rate, thereby reducing power consumption.

Figure 6:
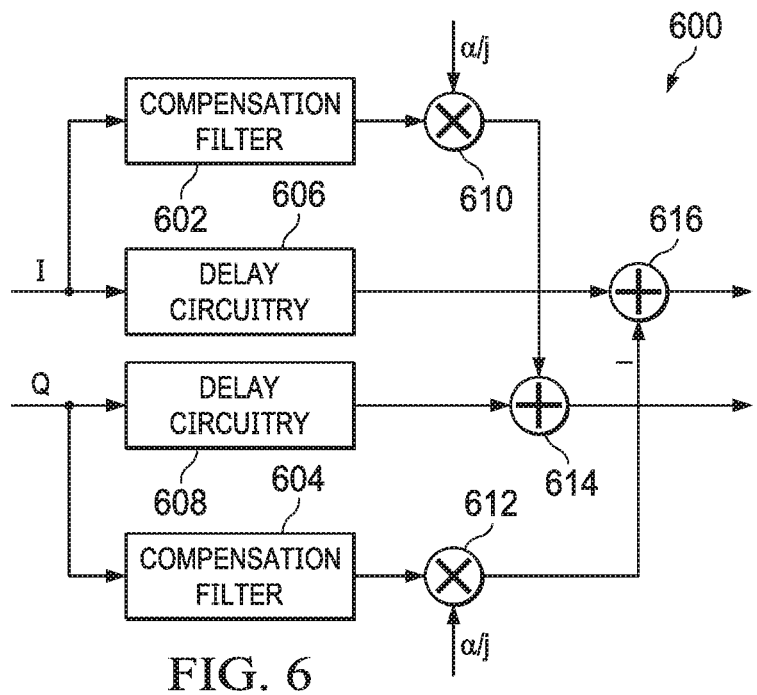
FIG. 6 is a block diagram of an example architecture of DAC response compensator with a purely imaginary coefficient α.

FIG. 6 illustrates an example DAC response compensator 600 configured to function in examples in which the complex parameter $\alpha$ is purely imaginary. In such cases, the resultant scaling by scaling mixer 508 in FIG. 5 is equivalent to scaling the compensation filter output of the I-chain by $\alpha/j$, the signed amplitude of the purely imaginary parameter $\alpha$, where j is the square root of negative one, adding this scaled compensation filter output of the I-chain to the delayed Q-chain signal, scaling the compensation filter output of the Q-chain by $\alpha/j$, and subtracting this scaled compensation filter output of the Q-chain from the delayed I-chain signal. FIG. 6 illustrates this resultant scaling equivalent by including two real-coefficient compensation filters 602, 604 that each operate on I and Q signals separately, two delay generators 606, 608, two scaling mixers 610, 612, adder 614 and signal subtractor 616. The real and imaginary parts of the input are operated in separation, allowing for an approximately linear compensation of the frequency domain spectrum to be more easily realized.

Figure 7:
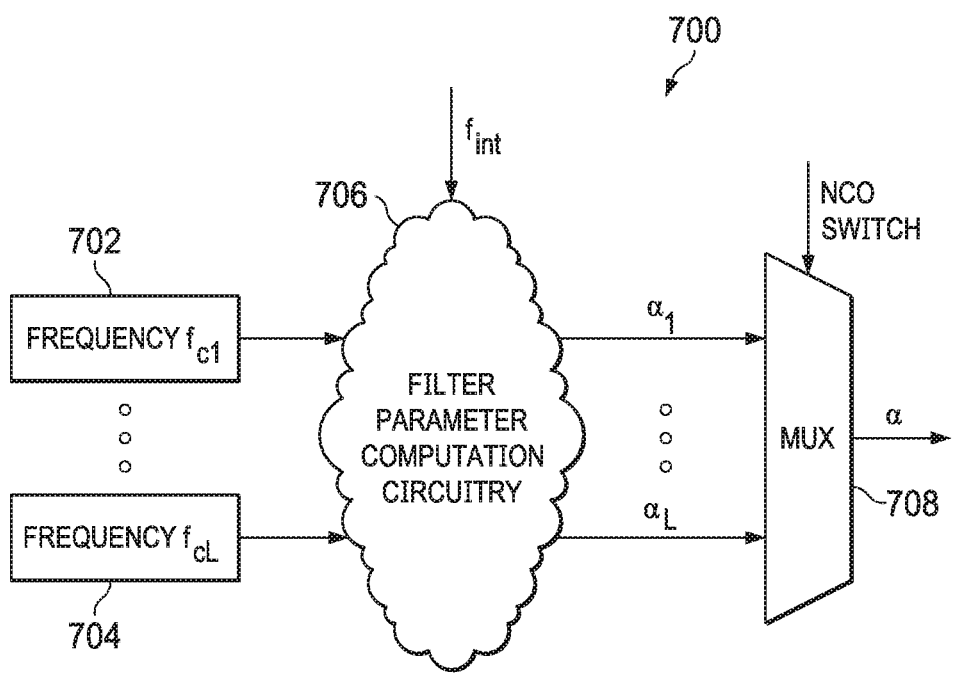
FIG. 7 is a block diagram of example dynamic switching of a DAC response compensator parameter α with an NCO switch signal that controls the center frequency.

Additionally, in an RF sampling transmitter, the center frequency $f_c$ of the transmit signal can be switched dynamically. The frequency switch can be controlled by a numerically controlled oscillator (NCO) switch signal. As DAC response compensator 500 or 600 only flattens the signal band of interest, FIG. 7 illustrates a mechanism 700 to dynamically switch the DAC compensator parameter $\alpha$ in a glitch-free manner using the NCO switch signal. A set of parameters $\{\alpha_0, \alpha_1, \ldots, \alpha_L\}$ can be pre-computed by filter parameter computation circuitry 706 and stored for each of the center frequencies 702 through 704 $\{f_{c0}, f_{c1}, \ldots, f_{cL}\}$ over which the dynamic NCO switching would be performed by multiplexer 708 using the NCO switch signal as its selector signal. Accordingly, the parameter $\alpha$ provided to scaling mixer 508 in the DAC response compensator 500 of FIG. 5 or to scaling mixers 610, 612 in the DAC response compensator 600 of FIG. 6 can be selected in a glitch-free manner from among the computed set of parameters $\{\alpha_0, \alpha_1, \ldots, \alpha_L\}$. In some examples, the number of frequencies, and thus the number of parameters, is L=4.

Figure 8:
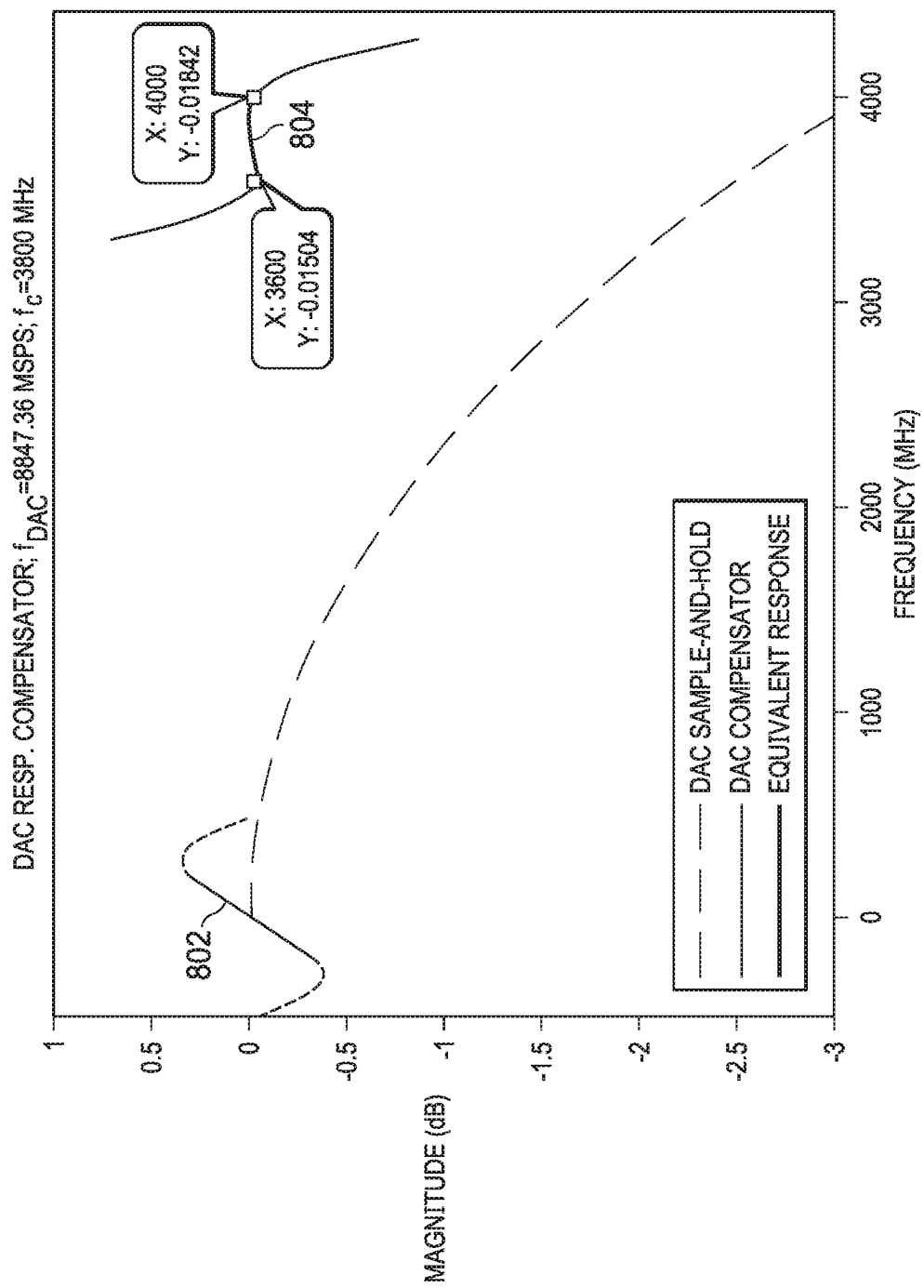
FIG. 8 is a frequency graph of an example implementation of a transformation-based decimation filter.

The efficacy of the DAC compensator-based transmitter described above and illustrated in FIGS. 4-7 is illustrated in FIG. 8 for a DAC sampling rate of 8,847.36 megasamples per second (MSPS) and a center frequency $f_c$ of 3,800 MHz. An interface rate of 491.52 MSPS (400 MHz bandwidth) is considered. The DAC compensator-based transmitter compensates the DAC sample-and-hold response only in the signal band of interest 802 centered around DC for the input complex baseband I/Q signal (interpolated by a factor of 2) and after the frequency up-conversion by the digital mixer results in a passband peak-to-peak ripple of less than 0.03 dB for the equivalent response 804 (the composite response from the DAC response compensator and the DAC sample-and-hold after shifting up to the new center frequency of 3,800 MHz, e.g., by mixers 418, 420).

In some examples, the DAC response compensator parameter $\alpha$ can be pre-computed offline as a function of the normalized center frequency $f_c$ for one or more such center frequencies, and stored, e.g., in a table. In other examples, the compensator parameter $\alpha$ can be computed on-the-fly using a simple polynomial fit with pre-stored complex coefficients. A cubic polynomial model for the computation of parameter $\alpha$ is given by:

$$\alpha_{intref} = c_0 + c_1 x + c_2 x^2 + c_3 x^3, \text{ where } x = 2f_c/f_s$$

$$\alpha = \alpha_{intref} * (f_{int}/f_{intref})$$

In the above equation, $f_{intref}$ is the reference interface frequency for which the polynomial model coefficients are pre-computed and stored. In some examples, it can be sufficient to pre-store four complex polynomial coefficients $\{c_0, \ldots, c_3\}$ to compute the compensator parameter $\alpha$. The above represents one way of providing the compensator parameter $\alpha$. Another way would be to pre-store different values of the compensator parameter $\alpha$ for different combinations of center frequency $f_c$ normalized by the sampling rate $f_s$ and the interface rate $f_{int}$.

Table 1 compares the normalized digital power consumption, in a 28 nm technology node, for a few RF DAC sample rates and example interface rates for a single-band mode of operation. As shown in the table, the DAC compensator-based transmitter described above results in a savings of between about 65 percent and 85 percent or more, depending on the interface rate and DAC sampling rate.

TABLE 1

Power consumption comparison of a DAC compensator-based transmitter with an inverse sinc filter-based transmitter for several combinations of DAC sampling rates $f_s$ and interface rates $f_{int}$

| DAC Sampling Rate $f_s$ | Interface Rate $f_{int}$ | Inverse Sinc Filter-Based Transmitter | DAC Compensator-Based Transmitter | Power Savings |
|---|---|---|---|---|
| 9 GSPS | 250 MSPS | ~X mW | ~0.17X mW | ~83% |
| 9 GSPS | 500 MSPS | ~X mW | ~0.33X mW | ~67% |
| 12 GSPS | 250 MSPS | ~1.33X mW | ~0.17X mW | ~87% |
| 12 GSPS | 500 MSPS | ~1.33X mW | ~0.33X mW | ~75% |

Transmission using an RF sampling DAC, such as DACs 102, 202, or 402, in some examples involves sending signals having center frequencies within the first Nyquist zone, that is, between DC (0 MHz) and $f_{DAC}/2$. The RF DAC can generate a continuous-time-domain signal, with a sample-and-hold operation, at a sampling rate of $f_{DAC}$. In an example sample-and-hold operation, a digital sample s(n) is transmitted from time instant nT to (nT+7), where $T=1/f_{DAC}$. The sample-and-hold response of the DAC is such that higher frequencies experience greater attenuation, which attenuation can be compensated for, as by inverse sinc filter 204 in the example of transmitter 200 or DAC response compensators 410, 412 in the example of transmitter 400. The graph of FIG. 3 only shows the DAC sample-and-hold response 302 until about 4 GHz, at which point the sample-and-hold reaches an attenuation of about −3 dB. Signals are attenuated very heavily at frequencies close to $f_{DAC}$. For example, at the sampling rate of $f_{DAC}$, at about 9 GSPS in the example 302 of FIG. 3, the DAC sample-and-hold response is zeroed out to null.

The spectral region between $f_{DAC}/2$ and $f_{DAC}$ is referred to as the second Nyquist zone. Although DACs are often configured to operate in the first Nyquist zone, in some examples the sample-and-hold behavior of the DAC can be configured such that the response is one that amplifies signals having frequencies greater than $f_{DAC}/2$ (in the second Nyquist zone) even though it may attenuate signals having frequencies lower than $f_{DAC}/2$ (in the first Nyquist zone). For example, a sample-and-hold behavior where a digital sample s(n) is transmitted from time instant nT to (nT+T/2), and a negated version of the same sample, −s(n), is transmitted from time instant (nT+T/2) to (nT+7), where $T=1/f_{DAC}$, would demonstrate such a response, favorable for transmission in the second Nyquist region. In such examples, the example transmitter 200 of FIG. 2 would require two filters in parallel—inverse sinc filter 204 and additional filter—to address the response present in the second Nyquist zone. By contrast, examples using a DAC response compensator of the type described herein, e.g., as shown in transmitter 400 of FIG. 4A or transmitter 450 of FIG. 4B, work for both the first and second Nyquist zones by appropriately configuring the complex parameter α differently between the first and second Nyquist zones, without any duplication of hardware or the need for an additional filter. The ability of transmitter 400 to function in both first and second Nyquist zones without hardware modification provides another advantage over transmitter 200.

The first-Nyquist-zone-transmission sample-and-hold DAC operation is only one possible operation of a DAC. There are other possible pulse shapes that a DAC could provide which would enable transmission in higher Nyquist zones. For example, an RF sampling DAC may be configured in a return-to-zero DAC mode. In such an example, a digital sample s(n) is transmitted from time instant nT to (nT+$T_0$), and the output is zeroed out for the duration (nT+$T_0$) to (nT+T), where $T=1/f_{DAC}$, and $T_0<T$ is an active duration of the pulse. As an example $T_0=T/2$ can be used. However, the usefulness of transmitter 200 having inverse sinc filter 204 may be limited by the choice of DAC pulse shapes, potentially requiring additional hardware to handle different DAC pulse shapes. By contrast, examples using a DAC response compensator of the type described herein, e.g., as shown in transmitter 400 of FIG. 4A or transmitter 450 of FIG. 4B, can work for different DAC pulse shapes, including return-to-zero DAC modes, by appropriately configuring the complex parameter α, without any duplication of hardware or the need for an additional filter. The ability of transmitter 400 or 450 to function in a return-to-zero DAC mode without hardware modification provides another advantage over transmitter 200. In other examples, DAC response compensators as shown in FIGS. 4A and 4B can be incorporated in the transmitter architecture 150 of FIG. 1B to provide sinc response compensation.

Figure 9:
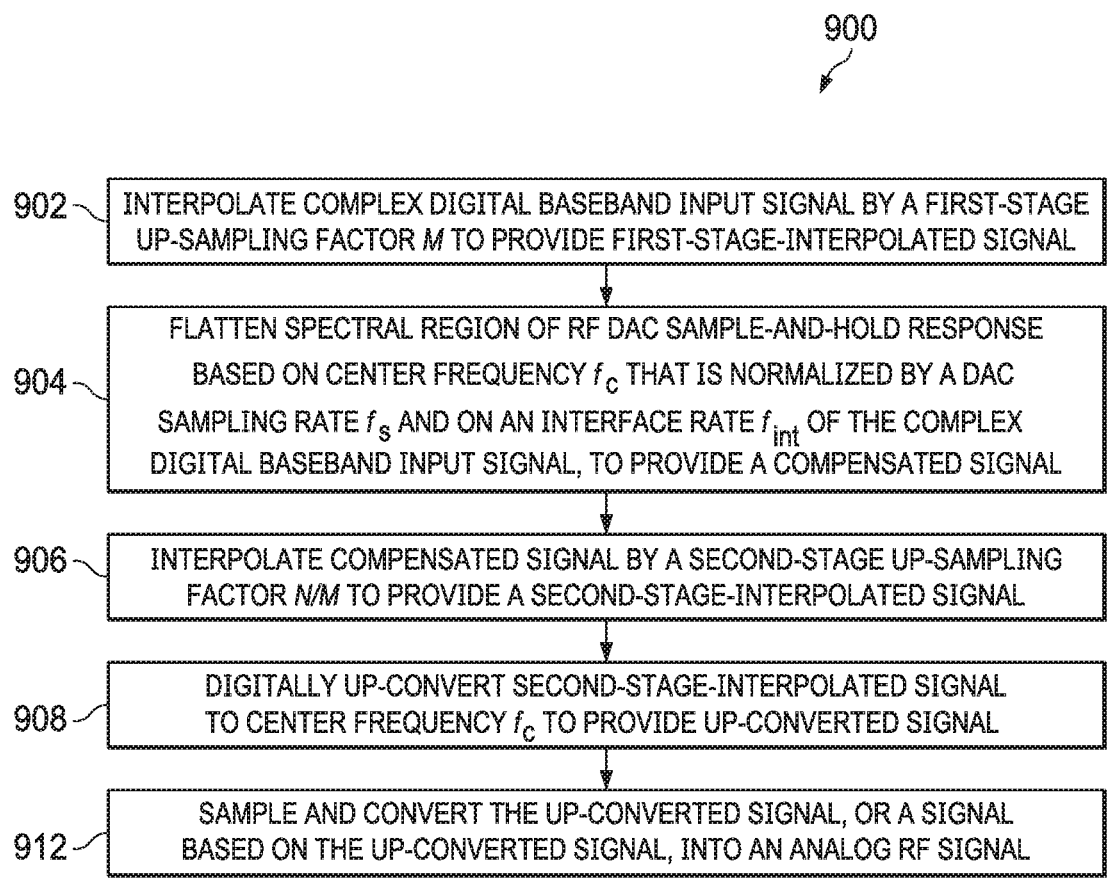
FIG. 9 is a flow chart illustrating an example method providing a low-complexity inverse sinc function for RF sampling transmitters.

FIG. 9 illustrates a method 900 of compensating for a sinc response in an RF sampling transmitter. A complex digital baseband input signal is interpolated 902 by a first-stage up-sampling factor M to provide a first-stage-interpolated signal. This interpolation can be done, for example, by interpolator 456 in FIG. 4B. In the first-stage-interpolated signal, a spectral region of an RF DAC sample-and-hold response is flattened 904 based on a center frequency $f_c$ that is normalized by a DAC sampling rate A and on an interface rate $f_{int}$ of the complex digital baseband input signal to provide a compensated signal. This flattening can be done, for example, by DAC response compensator 460 in FIG. 4B. The compensated signal is interpolated 906 by a second-stage up-sampling factor N/M to provide a second-stage-interpolated signal. This interpolation can be done, for example, by interpolator 464 in FIG. 4B. The second-stage-interpolated signal is digitally up-converted 908 to the center frequency $f_c$ to provide an up-converted signal. This digital up-conversion can be done, for example, by mixer 468 in FIG. 4B. The up-converted signal, or a signal based on the up-converted signal, is sampled and converted 912 into an analog RF signal, e.g., by RF DAC 452 in FIG. 4B.

In some examples of method 900, the flattening 904 of the spectral region in the first-stage-interpolated signal can include computing a complex parameter α based on a center frequency normalized by the DAC sampling rate and on the interface rate. Computation of complex parameter α can be done, for example, by filter parameter computation circuitry 506 in FIG. 5A. The first-stage-interpolated signal can be flattened with a fixed-coefficient digital compensation filter to provide an unscaled intermediate compensated signal. This flattening can be done, for example, by compensation filter 502 in FIG. 5A. The unscaled intermediate compensated signal can be multiplied by the complex parameter α to provide a scaled signal. This scaling can be done, for example, by mixer 508 in FIG. 5A. The first-stage-interpolated signal can be delayed to provide a delayed signal. This delay can be done, for example, by delay circuitry 504 in FIG. 5A. The scaled signal and the delayed signal can be summed together to provide the compensated signal. This summing can be done, for example, by summer 510 in FIG. 5A.

In some examples of method 900, the flattening 904 of the spectral region in the first-stage-interpolated signal can include computing a purely imaginary parameter α based on a center frequency normalized by the DAC sampling rate and on the interface rate. An in-phase component of the first-stage-interpolated signal can be filtered with a first fixed-coefficient digital compensation filter (e.g., compensation filter 602 in FIG. 6) to provide a first unscaled intermediate compensated signal. The first unscaled intermediate compensated signal can be multiplied by α/j, the signed amplitude of the purely imaginary parameter α (e.g., using mixer 610 in FIG. 6), to provide a first scaled signal. The in-phase component can be delayed (e.g., by delay circuitry 606 in FIG. 6) to provide a first delayed signal. A quadrature component of the first-stage-interpolated signal can be filtered with a second fixed-coefficient digital compensation filter (e.g., compensation filter 604 in FIG. 6) to provide a second unscaled intermediate compensated signal. The second unscaled intermediate compensated signal can be multiplied by α/j (e.g., using mixer 612 in FIG. 6) to provide a second scaled signal. The quadrature component can be delayed (e.g., by delay circuitry 608 in FIG. 6) to provide a second delayed signal. The second scaled signal can be subtracted from the first delayed signal (e.g., using subtractor 616 in FIG. 6) to provide a first DAC response compensator output signal component. The first scaled signal can be summed with the second delayed signal (e.g., using summer 614 in FIG. 6) to provide a second DAC response compensator output signal component.

Method 900 of FIG. 9 is generic to single-band, dual-band, or multi-band RF transmitter implementations.

Figure 10:
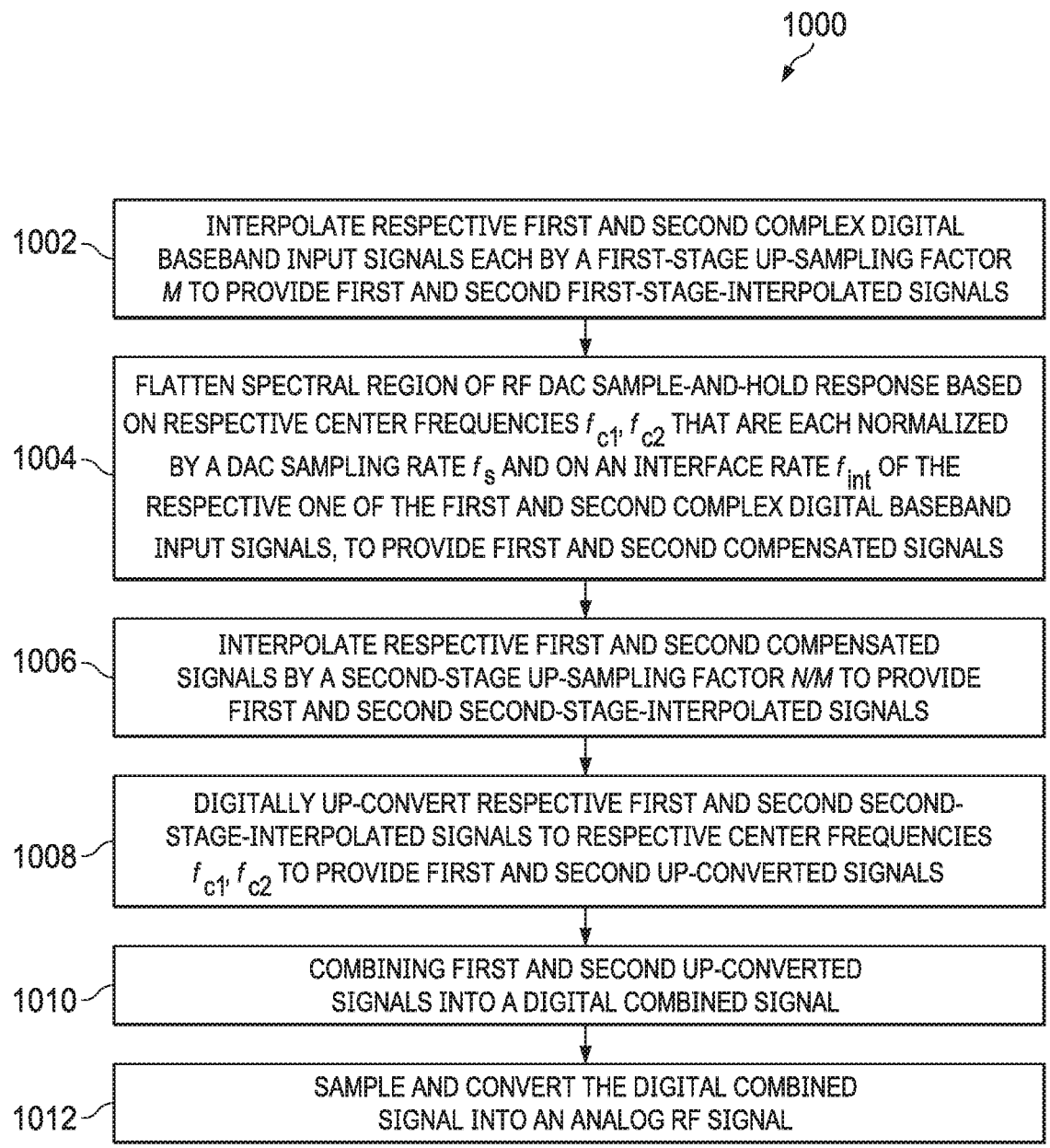
FIG. 10 is a flow chart illustrating an example method providing a low-complexity inverse sinc function for dual-band RF sampling transmitters.

Method 1000 of FIG. 10 is provided below as an example of a method that is a special case of method 900 pertaining particularly to dual-band RF transmitter implementations.

FIG. 10 illustrates a method 1000 of compensating for a sinc response in a dual-band RF sampling transmitter. Respective first and second complex digital baseband input signals are each interpolated 1002 by a first-stage up-sampling factor M to provide first and second first-stage-interpolated signals. This interpolation can be done, for example, by interpolators 406, 408 in FIG. 4A. In each of the first and second first-stage-interpolated signals, a spectral region of an RF DAC sample-and-hold response is flattened 1004 based on respective center frequencies $f_{c1}$, $f_{c2}$ that are each normalized by a DAC sampling rate $f_s$ and on an interface rate $f_{int}$ of the respective one of the first and second complex digital baseband input signals to provide first and second compensated signals. This flattening can be done, for example, by DAC response compensators 410, 412 in FIG. 4A. The respective first and second compensated signals are interpolated 1006 by a second-stage up-sampling factor N/M to provide first and second second-stage-interpolated signals. This interpolation can be done, for example, by interpolators 414, 416 in FIG. 4A. The respective first and second second-stage-interpolated signals are digitally up-converted 1008 to respective center frequencies $f_{c1}$, $f_{c2}$ to provide first and second up-converted signals. This digital up-conversion can be done, for example, by mixers 418, 420 in FIG. 4A. The first and second up-converted signals are combined 1010 into a digital combined signal. This combining can be done, for example, by summer 422 in FIG. 4A. The digital combined signal is sampled and converted 1012 into an analog RF signal, e.g., by RF DAC 402 in FIG. 4A.

In some examples of method 1000, the flattening 1004 of the spectral region in at least one of the first or second first-stage-interpolated signals can include computing a complex parameter α based on a center frequency normalized by the DAC sampling rate and on the interface rate. Computation of complex parameter α can be done, for example, by filter parameter computation circuitry 506 in FIG. 5A. The at least one of the first or second first-stage-interpolated signals can be flattened with a fixed-coefficient digital compensation filter to provide an unscaled intermediate compensated signal. This flattening can be done, for example, by compensation filter 502 in FIG. 5A. The unscaled intermediate compensated signal can be multiplied by the complex parameter α to provide a scaled signal. This scaling can be done, for example, by mixer 508 in FIG. 5A. The at least one of the first or second first-stage-interpolated signals can be delayed to provide a delayed signal. This delay can be done, for example, by delay circuitry 504 in FIG. 5A. The scaled signal and the delayed signal can be summed together to provide a respective one of the first or second compensated signals. This summing can be done, for example, by summer 510 in FIG. 5A.

In some examples of method 1000, the flattening 1004 of the spectral region in at least one of the first or second first-stage-interpolated signals can include computing a purely imaginary parameter α based on a center frequency normalized by the DAC sampling rate and on the interface rate. An in-phase component of the at least one of the first or second first-stage-interpolated signals can be filtered with a first fixed-coefficient digital compensation filter (e.g., compensation filter 602 in FIG. 6) to provide a first unscaled intermediate compensated signal. The first unscaled intermediate compensated signal can be multiplied by α/j, the signed amplitude of the purely imaginary parameter α (e.g., using mixer 610 in FIG. 6), to provide a first scaled signal. The in-phase component can be delayed (e.g., by delay circuitry 606 in FIG. 6) to provide a first delayed signal. A quadrature component of the at least one of the first or second first-stage-interpolated signals can be filtered with a second fixed-coefficient digital compensation filter (e.g., compensation filter 604 in FIG. 6) to provide a second unscaled intermediate compensated signal. The second unscaled intermediate compensated signal can be multiplied by α/j (e.g., using mixer 612 in FIG. 6) to provide a second scaled signal. The quadrature component can be delayed (e.g., by delay circuitry 608 in FIG. 6) to provide a second delayed signal. The second scaled signal can be subtracted from the first delayed signal (e.g., using subtractor 616 in FIG. 6) to provide a first DAC response compensator output signal component. The first scaled signal can be summed with the second delayed signal (e.g., using summer 614 in FIG. 6) to provide a second DAC response compensator output signal component.

In any of the above method examples, the complex parameter α can be computed using a polynomial fit to a cubic polynomial model with pre-stored complex coefficients, as described above with regard to FIG. 7. A plurality of complex parameters $\alpha_1$ through $\alpha_L$ (e.g., L=4) can be computed each based on a respective center frequency $f_{c1}$ through $f_{cL}$ normalized by the DAC sampling rate and on the interface rate. The complex parameter α can then be selected from among the plurality of computed complex parameters $\alpha_1$ through $\alpha_L$ based on a numerically controlled oscillator (NCO) switch signal (e.g., using multiplexer 708 in FIG. 7).

Various advantages are provided by the features of the DAC compensator-based transmitter and related methods described above. The transmitter and related methods use of a complex baseband DAC response compensator, at a sampling rate lower than the DAC sampling rate, to flatten the sample-and-hold response of the RF sampling DAC only in the passband of interest. The DAC response compensator flattens the DAC response for first Nyquist and second Nyquist modes of operation. The DAC response compensator handles both non-return-to-zero or return-to-zero modes of DAC operation. The transmitter and related methods perform the complex baseband DAC response compensation using a digital filter, with parameters determined based on the center frequency and interface rate. The compensation filter can have fixed real coefficients, followed by scaling with a variable complex parameter. The complex parameter can be made to be purely imaginary to further simplify the architecture of the DAC response compensator. The variable parameter can be computed using a polynomial fit based on the normalized center frequency and scaled with a normalized interface rate. The DAC response compensator parameter can be switched from a set of predetermined values that are mapped to the relevant band center frequency, based on an NCO switch signal.

For a number of reasons, a DAC compensator-based transmitter as described above and illustrated in FIGS. 4-7 can reduce circuit complexity and power usage as compared to implementations using an inverse sinc filter. Unlike examples in which circuitry is used to perform an inverse sinc operation over nearly the entire frequency spectrum from DC to close to $f_s/2$ (e.g., $0.45*f_s$), a DAC compensator-based transmitter performs DAC sample-and-hold response compensation only around a signal frequency band of interest. Transmitters that employ an inverse sinc operation are implemented at the DAC sampling rate, while a DAC response compensation transmitter can be implemented at a sampling rate lower than the DAC sampling rate. As shown in FIG. 2, the inverse sinc operation is performed on the real signal x(n), prior to providing it to the RF DAC. On the other hand, as shown in FIGS. 4A and 4B, the DAC response compensator 410, 412, or 460 operates on a complex baseband I/Q signal u(n). Additionally, the DAC response compensator parameters are dependent on the center frequency of the up-converted input signal, whereas in inverse sinc filter implementations, the inverse sinc filter coefficients are independent of the center frequency of the signal.

A DAC compensator-based transmitter as described above and illustrated in FIGS. 4-7 thus results in a lower power consumption, when compared to implementations using an inverse sinc filter that operates on signal(s) that have already been up-converted to the passband. For example, a DAC compensator-based transmitter can reduce power consumption by about 75 percent for an interface rate of 500 MSPS and a DAC sampling rate of 12 GSPS.

A DAC compensator-based transmitter as described above can be implemented in an integrated transceiver incorporated into a variety of electronic systems. Such systems include, as examples, wireless base stations, test systems, measurement systems, and radar systems.

Figure 11:
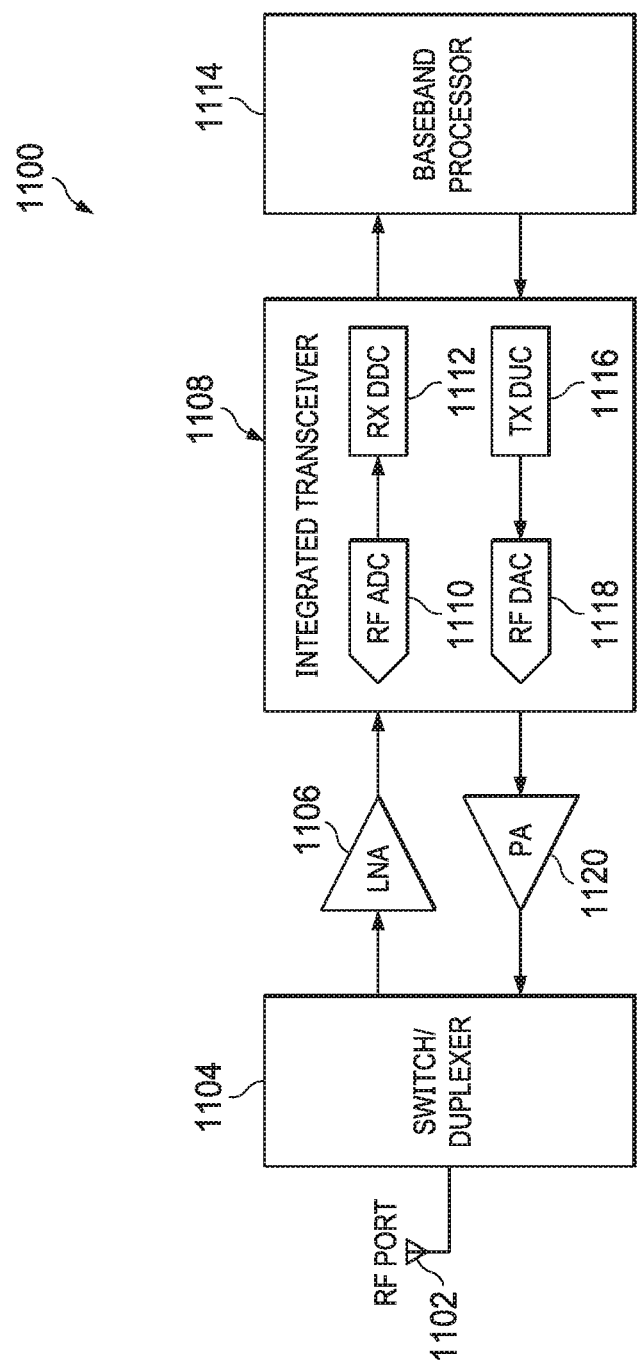
FIG. 11 is a block diagram of an example wireless base station transceiver system.

FIG. 11 illustrates an example wireless base station transceiver system 1100, e.g., for 5G systems, with an integrated transceiver 1108 that includes an RF sampling transmitter with a high-speed, high-performance transmitter (TX) DUC 1116 and an RF sampling DAC 1118 operating at multi-GSPS rates (e.g, 12 GSPS). Baseband processor 1114 provides complex baseband I/Q samples to integrated transceiver 1108, which interpolates, filters, and up-converts the complex baseband I/Q samples to a specified RF frequency. The RF sampling transmitter can include DAC response compensator circuitry (not specifically shown) configured to perform an inverse sinc operation by inverting the sample-and-hold response of RF sampling DAC 1118 only in a passband of interest. The DAC response compensator circuitry can be according to any of the examples described above and illustrated in FIGS. 4A, 4B, 5A, 5B, 6, and 7. An output RF signal from integrated transceiver 1108 is provided to power amplifier 1120, which amplifies the output RF signal. The output of power amplifier 1120 is provided to switch or duplexer 1104 that couples the output RF signal to RF port 1102 for transmission. For example, RF port 1102 can be an antenna that transmits the output RF signal wirelessly.

Additionally, an input RF signal can be received at RF port 1102 and coupled to a low-noise amplifier (LNA) 1106 by switch or duplexer 1104. The input RF signal can be amplified by LNA 1106 and provided to integrated transceiver 1108. Integrated transceiver 1108 may then employ an RF analog-to-digital converter (ADC) to sample the received RF signal and a receiver (RX) digital down-converter (DDC) to down-convert, filter, and decimate samples output from RF ADC 1110 to generate received complex baseband I/Q samples. The received complex baseband I/Q samples can be provided to baseband processor 1114 for further processing. The example transceiver system 1100 illustrated in FIG. 11 is for a wireless base station. Similar block diagrams are applicable to radar systems and test-and-measurement systems.

The systems described herein can be implemented, and the methods described herein can be carried out, using an application-specific integrated circuit (ASIC) or multiple coupled ASICs; as a field-programmable gate array (FPGA) or multiple coupled FPGAs, or within a digital signal processor (DSP) or multiple coupled DSPs. In this description, the term "based on" means based at least in part on. In this description, the term "couple" or "couples" means either an indirect or direct wired or wireless connection. Thus, if a first device, element, or component couples to a second device, element, or component, that coupling may be through a direct coupling or through an indirect coupling via other devices, elements, or components and connections. Similarly, a device, element, or component that is coupled between a first component or location and a second component or location may be through a direct connection or through an indirect connection via other devices, elements, or components and/or couplings. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

Modifications are possible in the described embodiments, and other embodiments are possible, within the scope of the claims.

What is claimed is:

1. A system comprising:
    a first-stage up-sampler configured to interpolate a complex digital baseband input signal by a first-stage up-sampling factor M;
    a digital-to-analog converter (DAC) response compensator coupled to an output of the first-stage up-sampler, the DAC response compensator configured to flatten a spectral region of an RF DAC sample-and-hold response based on a center frequency $f_{c1}$ that is normalized by a DAC sampling rate $f_s$ and on an interface rate $f_{int}$ of the complex digital baseband input signal;
    a second-stage up-sampler coupled to an output of the DAC response compensator and configured to interpolate an output signal from the DAC response compensator by a second-stage up-sampling factor NIM;
    a digital up-conversion mixer coupled to an output of the second-stage up-sampler and configured to convert an output signal from the second-stage up-sampler to the center frequency $f_{c1}$; and
    an RF sampling DAC coupled to an output of the digital up-conversion mixer and configured to convert an output of the digital up-conversion mixer or a signal based on the output of the digital up-conversion mixer into an analog signal;
    wherein M and N are integers greater or equal to one.

2. The system of claim 1, wherein the DAC response compensator comprises:
    a fixed-coefficient digital compensation filter configured to receive and filter a complex digital input signal; and a scaling mixer coupled to an output of the compensation filter and configured to multiply an output signal from the fixed-coefficient digital compensation filter by a complex parameter $\alpha$.

3. The system of claim 2, further comprising at least a second fixed-coefficient digital compensation filter configured to receive and filter the complex digital input signal and a second scaling mixer coupled to an output of the second fixed-coefficient digital compensation filter, the second scaling mixer being configured to multiply an output signal from the second fixed-coefficient digital compensation filter by a second complex parameter $\alpha_2$.

4. The system of claim 2, wherein the DAC response compensator further comprises filter parameter computation circuitry configured to compute the complex parameter $\alpha$ based on a center frequency normalized by the DAC sampling rate and on the interface rate, using a polynomial fit to a cubic polynomial model with pre-stored complex coefficients,
the DAC response compensator being coupled to an input of the scaling mixer to provide the scaling mixer with the complex parameter $\alpha$.

5. The system of claim 4,
wherein the filter parameter computation circuitry is configured to compute a plurality of complex parameters $\alpha_1$ through $\alpha_L$ each based on a respective center frequency $f_{c1}$ through $f_{cL}$ normalized by the DAC sampling rate and on the interface rate $f_{int}$, and
wherein the DAC response compensator further comprises a multiplexer configured to select the complex parameter $\alpha$ from among the plurality of computed complex parameters $\alpha_1$ through $\alpha_L$ based on a numerically controlled oscillator (NCO) switch signal.

6. The system of claim 1, wherein at the DAC response compensator comprises:
filter parameter computation circuitry configured to compute a purely imaginary parameter $\alpha$ based on a center frequency normalized by the DAC sampling rate and on the interface rate;
a first fixed-coefficient digital compensation filter configured to receive an in-phase component of a complex digital input signal;
a first scaling mixer coupled to an output of the first compensation filter and configured to multiply an output signal from the first compensation filter by an amplitude of the purely imaginary parameter $\alpha$;
first delay circuitry configured to receive the in-phase component of the complex digital input signal;
a second fixed-coefficient digital compensation filter configured to receive a quadrature component of the complex digital input signal;
a second scaling mixer coupled to an output of the second compensation filter and configured to multiply an output signal from the second compensation filter by the amplitude of the purely imaginary parameter $\alpha$;
second delay circuitry configured to receive the quadrature component of the complex digital input signal;
a subtractor coupled to respective outputs of the second mixer and the first delay circuitry and configured to subtract an output signal from the second mixer from an output signal from the first delay circuitry to provide a first DAC response compensator output signal component; and
an adder coupled to respective outputs of the first mixer and the second delay circuitry and configured to sum output signals from the first mixer and the second delay circuitry to provide a second DAC response compensator output signal component.

7. The system of claim 1, wherein the first-stage up-sampling factor M equals 2.

8. The system of claim 1, wherein the first and second DAC response compensators flatten the spectral region of the RF DAC sample-and-hold response in both first and second Nyquist zones.

9. The system of claim 1, wherein the first and second DAC response compensators flatten the DAC response for both non-return-to-zero (NRZ) and return-to-zero (RZ) modes of DAC operation.

10. The system of claim 1 implemented in an integrated transceiver incorporated into a wireless base station, a radar system, or a test-and-measurement system.

11. A method of compensating for a sinc response in a radio-frequency (RF) sampling transmitter, the method comprising:
interpolating a complex digital baseband input signal by a first-stage up-sampling factor M to provide a first-stage-interpolated signal,
in the first-stage-interpolated signal, flattening a spectral region of an RF digital-to-analog converter (DAC) sample-and-hold response based on a center frequency $f_c$ that is normalized by a DAC sampling rate $f_s$ and on an interface rate $f_{int}$ of the complex digital baseband input signal, to provide a compensated signal;
interpolating the compensated signal by a second-stage up-sampling factor NIM to provide a second-stage-interpolated signal;
digitally up-converting the second-stage-interpolated signal to the center frequency $f_c$ to provide an up-converted signal; and
sampling and converting the up-converted signal or a signal based on the up-converted signal into an analog RF signal;
wherein M and N are integers greater or equal to one.

12. The method of claim 11, wherein the flattening of the spectral region in at least one of the first or second first-stage-interpolated signals comprises:
filtering the first-stage-interpolated signal with a fixed-coefficient digital compensation filter to provide an unscaled intermediate compensated signal; and
multiplying the unscaled intermediate compensated signal by a complex parameter $\alpha$ to provide a scaled signal.

13. The method of claim 12, wherein the complex parameter $\alpha$ is computed based on a center frequency normalized by the DAC sampling rate and on the interface rate, using a polynomial fit to a cubic polynomial model with pre-stored complex coefficients.

14. The method of claim 12, further comprising:
computing a plurality of complex parameters $\alpha_1$ through $\alpha_L$ each based on a respective center frequency $f_{c1}$ through $f_{cL}$ normalized by the DAC sampling rate and on the interface rate, and
selecting the complex parameter $\alpha$ from among the plurality of computed complex parameters $\alpha_1$ through $\alpha_L$ based on a numerically controlled oscillator (NCO) switch signal.

15. The method of claim 11, wherein the flattening of the spectral region in the first-stage-interpolated signal comprises:
computing a purely imaginary parameter $\alpha$ based on a center frequency normalized by the DAC sampling rate and on the interface rate;

filtering an in-phase component of the first-stage-interpolated signal with a first fixed-coefficient digital compensation filter to provide a first unscaled intermediate compensated signal;

multiplying the first unscaled intermediate compensated signal by the purely imaginary parameter $\alpha$ to provide a first scaled signal;

delaying the in-phase component to provide a first delayed signal;

filtering a quadrature component of the first-stage-interpolated signal with a second fixed-coefficient digital compensation filter to provide a second unscaled intermediate compensated signal;

multiplying the second compensated signal by the purely imaginary parameter a to provide a second scaled signal;

delaying the quadrature component to provide a second delayed signal;

subtracting the second scaled signal from the first delayed signal to provide a first DAC response compensator output signal component; and summing the first scaled signal with the second delayed signal to provide a second DAC response compensator output signal component.

16. The method of claim 15, wherein the purely imaginary parameter $\alpha$ is computed using a polynomial fit to a cubic polynomial model with pre-stored complex coefficients.

17. The method of claim 11, the spectral region of the RF DAC sample-and-hold response is flattened in both first and second Nyquist zones.

18. The method of claim 11, wherein the DAC response is flattened for both non-return-to-zero (NRZ) and return-to-zero (RZ) modes of DAC operation.

19. A wireless base station transceiver system comprising:
a baseband processor configured to provide complex baseband In-phase and Quadrature-phase (I/Q) samples;
an integrated transceiver coupled to the baseband processor and configured to interpolate, filter, and up-convert the complex baseband I/Q samples to an RF frequency, the integrated transceiver comprising:
a radio-frequency (RF) sampling transmitter comprising a transmitter (TX) digital up-converter (DUC), and
an RF sampling DAC having a sample-and-hold response,
wherein the RF sampling transmitter further comprises DAC response compensator circuitry configured to perform an inverse sinc operation by inverting the sample-and-hold response of the RF sampling DAC only in a passband of interest;
a power amplifier coupled to the integrated transceiver and configured to amplify an analog RF output signal from the integrated transceiver; and
an RF port coupled to the power amplifier and configured to transmit the amplified analog RF output signal from the power amplifier.

20. The wireless base station transceiver system of claim 19,
wherein the RF port is coupled to the power amplifier via a switch or duplexer;
wherein the RF port is coupled to a low-noise amplifier (LNA) via the switch or duplexer, the LNA being configured to amplify an input RF signal from the RF port;
wherein the LNA is coupled to the integrated transceiver to provide the amplified input RF signal to the integrated transceiver;
wherein the integrated transceiver further comprises:
an RF analog-to-digital converter (ADC) configured to sample the amplified input RF signal, and
a receiver (RX) digital down-converter (DDC) coupled to the RF ADC and configured to down-convert, filter, and decimate samples output from RF ADC to generate received complex baseband I/Q samples; and
wherein the baseband processor is configured to further process the received complex baseband I/Q samples from the RX DDC.

* * * * *